(12) United States Patent
Kodama et al.

(10) Patent No.: US 10,189,315 B2
(45) Date of Patent: Jan. 29, 2019

(54) PNEUMATIC TIRE

(71) Applicant: The Yokohama Rubber Co., LTD., Minato-ku, Tokyo (JP)

(72) Inventors: Yuji Kodama, Hiratsuka (JP); Masataka Koishi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 662 days.

(21) Appl. No.: 14/411,039

(22) PCT Filed: May 1, 2013

(86) PCT No.: PCT/JP2013/062719
§ 371 (c)(1),
(2) Date: Dec. 23, 2014

(87) PCT Pub. No.: WO2014/010297
PCT Pub. Date: Jan. 16, 2014

(65) Prior Publication Data
US 2015/0183275 A1    Jul. 2, 2015

(30) Foreign Application Priority Data

Jul. 11, 2012 (JP) .................. 2012-155920

(51) Int. Cl.
*B60C 13/02* (2006.01)
*B60C 5/12* (2006.01)

(52) U.S. Cl.
CPC ............... *B60C 13/02* (2013.01); *B60C 5/12* (2013.01)

(58) Field of Classification Search
CPC .................... B60C 5/12; B60C 13/02
USPC ........................................... 152/523
See application file for complete search history.

(56) References Cited

U.S. PATENT DOCUMENTS

| | | | | |
|---|---|---|---|---|
| 7,308,924 B2* | 12/2007 | Kajita | ............... | B60C 13/00 152/539 |
| 9,102,201 B2* | 8/2015 | Yukawa | ............... | B60C 17/0009 |
| 2004/0238094 A1* | 12/2004 | Kajita | ............... | B60C 13/00 152/454 |
| 2010/0193102 A1 | 8/2010 | Tsuruta et al. | | |

(Continued)

FOREIGN PATENT DOCUMENTS

| | | |
|---|---|---|
| EP | 2 236 319 | 10/2010 |
| JP | H04-0238703 | 8/1992 |

(Continued)

OTHER PUBLICATIONS

International Search Report for International Application No. PCT/JP2013/062719 dated Jul. 9, 2013, 4 pages, Japan.

*Primary Examiner* — Seyed Masoud Malekzadeh
(74) *Attorney, Agent, or Firm* — Thorpe North & Western

(57) ABSTRACT

The pneumatic tire having a vehicle inner/outer orientation when mounted on a vehicle includes: protrusions provided on a vehicle inner side on a tire side portion in a tire circumferential direction; and a plurality of recesses provided on a vehicle outer side on a tire side portion, wherein the height of projection of the protrusions from the tire side portion is more than 4 mm and not more than 10 mm, the protrusions are formed elongated and the bending rigidity in a lateral direction satisfies a range not less than 0.1 MPa·mm$^4$ and not more than 10,000 MPa·mm$^4$.

15 Claims, 9 Drawing Sheets

(56) References Cited

U.S. PATENT DOCUMENTS

| | | | |
|---|---|---|---|
| 2010/0300594 A1* | 12/2010 | Mukai | B60C 13/001 |
| | | | 152/523 |
| 2011/0036475 A1 | 2/2011 | Kojima et al. | |
| 2011/0041971 A1 | 2/2011 | Kuroishi | |
| 2011/0088826 A1* | 4/2011 | Watanabe | B60C 13/02 |
| | | | 152/523 |
| 2011/0108174 A1* | 5/2011 | Takahashi | B60C 13/02 |
| | | | 152/153 |
| 2012/0060994 A1* | 3/2012 | Hayashi | B60C 17/0009 |
| | | | 152/523 |
| 2012/0085473 A1 | 4/2012 | Matsuo et al. | |
| 2012/0097304 A1 | 4/2012 | Kojima et al. | |
| 2012/0097305 A1 | 4/2012 | Kuroshi et al. | |
| 2013/0292025 A1 | 11/2013 | Kuroishi et al. | |

FOREIGN PATENT DOCUMENTS

| | | |
|---|---|---|
| JP | 2009-029370 | 2/2009 |
| JP | 2009-029377 | 2/2009 |
| JP | 2009-029379 | 2/2009 |
| JP | 2010-260378 | 11/2010 |
| JP | 2011-168219 | 9/2011 |
| JP | 2010-260377 | 11/2014 |
| WO | WO 2009/084633 | 7/2009 |
| WO | WO 2010-126091 | 11/2010 |
| WO | WO 2010-126144 | 11/2010 |

\* cited by examiner

|  | Conventional Example | Working Example 1 | Working Example 2 | Working Example 3 | Working Example 4 | Working Example 5 | Working Example 6 | Working Example 7 |
|---|---|---|---|---|---|---|---|---|
| Protrusions disposed on vehicle inner side | ○ | ○ | ○ | ○ | ○ | ○ | ○ | ○ |
| Recesses disposed on vehicle inner side | ○ | ○ | ○ | ○ | ○ | ○ | ○ | ○ |
| Height of protrusions [mm] | 4 | 4.1 | 10 | 5 | 5 | 5 | 5 | 5 |
| Bending rigidity of protrusions [MPa · mm⁴] | 0.05 | 0.1 | 10000 | 1 | 10 | 1000 | 100 | 100 |
| Number of protrusions in tire circumferential direction [No.] | 55 | 55 | 55 | 20 | 20 | 20 | 20 | 10 |
| Width of protrusions [mm] | 0.45 | 0.45 | 0.45 | 1 | 1 | 5 | 2.5 | 5 |
| Overlap of row of fins | × | × | × | × | × | × | × | × |
| Inclination of protrusions with respect to tire radial direction [°] | 65 | 65 | 65 | 65 | 65 | 65 | 65 | 65 |
| Outline of protrusions (cross-sectional shape) | Straight lines (rectangular) | Straight lines (rectangular) | Straight lines (rectangular) | Straight lines (rectangular) | Straight lines (rectangular) | Straight lines (rectangular) | Straight lines (rectangular) | Straight lines (rectangular) |
| Diameter dimension of recesses [mm] | 0.45 | 0.45 | 0.45 | 0.45 | 0.45 | 0.45 | 0.45 | 0.45 |
| Depth of recesses [mm] | 0.25 | 0.25 | 0.25 | 0.25 | 0.25 | 0.25 | 0.25 | 0.25 |
| Fuel economy improvement rate | 100 | 101 | 103 | 102 | 102 | 101 | 102 | 101 |

| | Working Example 8 | Working Example 9 | Working Example 10 | Working Example 11 | Working Example 12 | Working Example 13 | Working Example 14 | Working Example 15 |
|---|---|---|---|---|---|---|---|---|
| Protrusions disposed on vehicle inner side | ○ | ○ | ○ | ○ | ○ | ○ | ○ | ○ |
| Recesses disposed on vehicle inner side | ○ | ○ | ○ | ○ | ○ | ○ | ○ | ○ |
| Height of protrusions [mm] | 5 | 5 | 5 | 8 | 5 | 5 | 5 | 5 |
| Bending rigidity of protrusions [MPa · mm⁴] | 100 | 100 | 100 | 100 | 100 | 100 | 100 | 100 |
| Number of protrusions in tire circumferential direction [No.] | 50 | 20 | 20 | 20 | 20 | 20 | 20 | 20 |
| Width of protrusions [mm] | 0.5 | 3.5 | 3.5 | 3.5 | 3.5 | 3.5 | 3.5 | 3.5 |
| Overlap of row of fins | × | ○ | × | × | × | ○ | ○ | ○ |
| Inclination of protrusions with respect to tire radial direction [°] | 65 | 65 | 60 | -60 | 45 | 45 | 45 | 45 |
| Outline of protrusions (cross-sectional shape) | Straight lines (rectangular) | Straight lines (rectangular) | Straight lines (rectangular) | Straight lines (rectangular) | Curved lines (semi-circular) | Straight lines (rectangular) | Straight lines (rectangular) | Straight lines (triangular) |
| Diameter dimension of recesses [mm] | 0.45 | 0.45 | 0.45 | 0.45 | 0.5 | 0.5 | 10 | 10 |
| Depth of recesses [mm] | 0.25 | 0.25 | 0.25 | 0.25 | 0.3 | 0.3 | 2 | 2 |
| Fuel economy improvement rate | 101 | 102 | 102 | 102 | 102 | 102 | 102 | 103 |

PNEUMATIC TIRE

TECHNICAL FIELD

The present technology relates to a pneumatic tire and particularly relates to a pneumatic tire by which air flow around a tire can be improved.

BACKGROUND

Conventionally, for example in Japanese Unexamined Patent Application Publication No. 2010-260378A, a pneumatic tire is disclosed in which a plurality of protrusions (projections) extending in the tire radial direction is provided at predetermined intervals in the tire circumferential direction on the tire side portion (tire side surface) on the inner side in the vehicle width direction when the tire is mounted on a vehicle, and a plurality of recesses is provided over the tire circumferential direction and the tire radial direction on the tire side portion on the outer side in the vehicle width direction when the tire is mounted on a vehicle. When mounted on a vehicle, air flows uniformly toward the rear on the outer side in the vehicle width direction, but on the inner side in the vehicle width direction, the tire is disposed within the tire house, and other components such as the axle and the like are disposed nearby, so the flow of the air is easily disturbed. According to this pneumatic tire, an air flow circulation promotion effect and flow rectification effect are obtained and the air resistance is reduced by the protrusions provided on the tire side portion on the inner side in the vehicle width direction where the air flow is easily disturbed, and turbulent flow is produced when the vehicle is traveling by the recesses provided on the tire side portion on the outer side in the vehicle width direction, the drag force that tends to pull the tire backward due to the low pressure portion produced to the rear of the tire when traveling is reduced, so the fuel consumption is improved.

In the pneumatic tire disclosed in Japanese Unexamined Patent Application Publication No. 2010-260378A as described above, the height of the protrusions is not less than 0.5 mm and not more than 4 mm, but as a result of the research by the inventors and others, it has been found that the flow promotion effect and flow rectification effect that reduces the air resistance is significantly obtained when the protrusions exceed the above heights. However, if the height of the protrusions is not less than the above height, the protrusions are easily deformed by the centrifugal force associated with rotation of the tire and the force from the flow of the air, so the above effects are difficult to obtain sufficiently. Moreover, when the protrusions are deformed, the durability of the protrusions deteriorates. However, if deformation of the protrusions is suppressed too much, the cross-section of the protrusions will increase and the mass of the tire will increase, so the rolling resistance will tend to increase.

SUMMARY

The present technology provides a pneumatic tire that is capable of effectively reducing the air resistance of the vehicle while suppressing the deterioration in air resistance of the protrusions and the increase in rolling resistance of the tire.

The pneumatic tire according to the present technology has a vehicle inner/outer orientation when mounted on a vehicle, including a plurality of protrusions provided on a vehicle inner side on a tire side portion in the tire circumferential direction and a plurality of recesses provided on a vehicle outer side on a tire side portion, wherein the height of projection of the protrusions from the tire side portion is more than 4 mm and not more than 10 mm, the protrusions are formed elongated and the bending rigidity in a lateral direction satisfies a range not less than 0.1 MPa·mm$^4$ and not more than 10,000 MPa·mm$^4$.

The air flow from the front to the rear of the vehicle is promoted and rectified by the protrusions on the vehicle inner side of the pneumatic tire. Therefore, turbulence of the air flow passing the vehicle inner side of the pneumatic tire is suppressed. On the other hand, the air flow from the front to the rear of the vehicle is made turbulent by the recesses on the vehicle outer side of the pneumatic tire, and a turbulent boundary layer is generated around the pneumatic tire, which suppresses separation from the pneumatic tire. Therefore, spreading of the air flow passing the vehicle outer side of the pneumatic tire is suppressed. As a result, the spread of the passing air is suppressed, so the air resistance of the vehicle is reduced, and the fuel economy can be further improved.

Moreover, if the height of the protrusions is less than 4 mm, the range over which the protrusions contact the flow of air will be small, so it is difficult to obtain a more significant flow promotion effect and rectification effect due to the protrusions. Also, if the height of the protrusions exceeds 10 mm, the range over which the protrusions contact the flow of air will be large, so the protrusions will increase the air resistance and the flow promotion effect and rectification effect will be small. On this point, when the height of the protrusions is more than 4 mm and not more than 10 mm, the protrusions appropriately contact the flow of air, and thereby it is possible to obtain a more significant flow promotion effect and rectification effect due to the protrusions, and the air resistance of the vehicle can be effectively reduced.

In addition, when the height of the protrusions exceeds 4 mm, the air resistance of the protrusions is large due to the centrifugal force associated with rotation of the tire and the force due to the air flow, so the protrusions are easily deformed and it is difficult to obtain the above effects sufficiently. When the protrusions are deformed, the durability of the protrusions deteriorates. Therefore, the bending rigidity EI in the lateral direction of the protrusions is not less than 0.1 MPa·mm$^4$. However, if deformation of the protrusions is suppressed too much, the cross-section of the protrusions will increase and the mass of the tire will increase, so the rolling resistance will tend to increase, so the bending rigidity EI of the protrusions in the lateral direction is not more than 10,000 (MPa·mm$^4$).

Also, in the pneumatic tire according to the present technology, the number of protrusions provided along the tire circumferential direction satisfies the range not less than 10 and not more than 50, and the width in the lateral direction satisfies the range not less than 0.5 mm and not more than 5 mm.

When the number of protrusions is less than 10, it is difficult to obtain the air flow promotion effect and the rectification effect. On the other hand, when the number of protrusions exceeds 50, the protrusions will increase the air resistance and the air flow promotion effect and the rectification effect becomes smaller, the tire mass increases and the rolling resistance tends to increase. Therefore, preferably the number of protrusions is in the range not less than 10 and not more than 50. Moreover, when the width of the protrusions is less than 0.5 mm, the protrusions can easily deform and it becomes difficult to obtain the air flow promotion effect and the rectification effect. On the other hand, when the width of the protrusions exceeds 5 mm, the protrusions will increase the air resistance and the air flow promotion effect and the rectification effect becomes smaller, the tire mass increases and the rolling resistance tends to increase. Therefore, preferably, the width of the protrusions is in the range not less than 0.5 mm and not more than 5 mm.

Also, in the pneumatic tire according to the present technology, the protrusions are formed as a row of fins that is divided into a plurality of fins in the longitudinal direction. In the row of fins, the fins overlap with each other in the tire circumferential direction and the tire radial direction, and extend overall in the tire radial direction.

According to this pneumatic tire, the strain in the protrusions that occurs when the tire side portion is bent in the tire circumferential direction and the tire radial direction is reduced by the overlap of the fins, so the durability of the protrusions can be increased.

Also, in the pneumatic tire according to the present technology, the inclination of the protrusions in the longitudinal direction with respect to the tire radial direction satisfies the range ±60°.

According to this pneumatic tire, the strain in the protrusions that occurs when the tire side portion is bent in the tire circumferential direction and the tire radial direction is reduced by the inclination of the protrusions, so the durability of the protrusions can be increased.

Also, in the pneumatic tire according to the present technology, the diameter dimension of the opening of the recesses satisfies the range not less than 0.5 mm and not more than 10 mm, and the depth satisfies the range not less than 0.3 mm and not more than 2 mm.

If the diameter dimension of the openings of the recesses is not less than 0.5 mm and the depth is not less than 0.3 mm, sufficient turbulence generation effect can be obtained. On the other hand, if the diameter dimension of the openings of the recesses is not more than 10 mm and the depth is not more than 2 mm, the turbulence generation effect can be obtained without increasing the air resistance.

The pneumatic tire according to the present technology is capable of effectively reducing the air resistance of the vehicle while suppressing the deterioration in air resistance of the protrusions and the increase in rolling resistance of the tire.

BRIEF DESCRIPTION OF THE DRAWINGS

FIGS. 18A-B include a table showing results of performance testing of pneumatic tires according to examples of the present technology.

DETAILED DESCRIPTION

An embodiment of the present technology is described below in detail based on the drawings. However, the present technology is not limited to these embodiments. The constituents of the embodiment include constituents that can be easily replaced by those skilled in the art and constituents substantially same as the constituents of the embodiment. Furthermore, the multiple modified examples described in the embodiment can be combined as desired within the scope apparent to a person skilled in the art.

Figure 1:
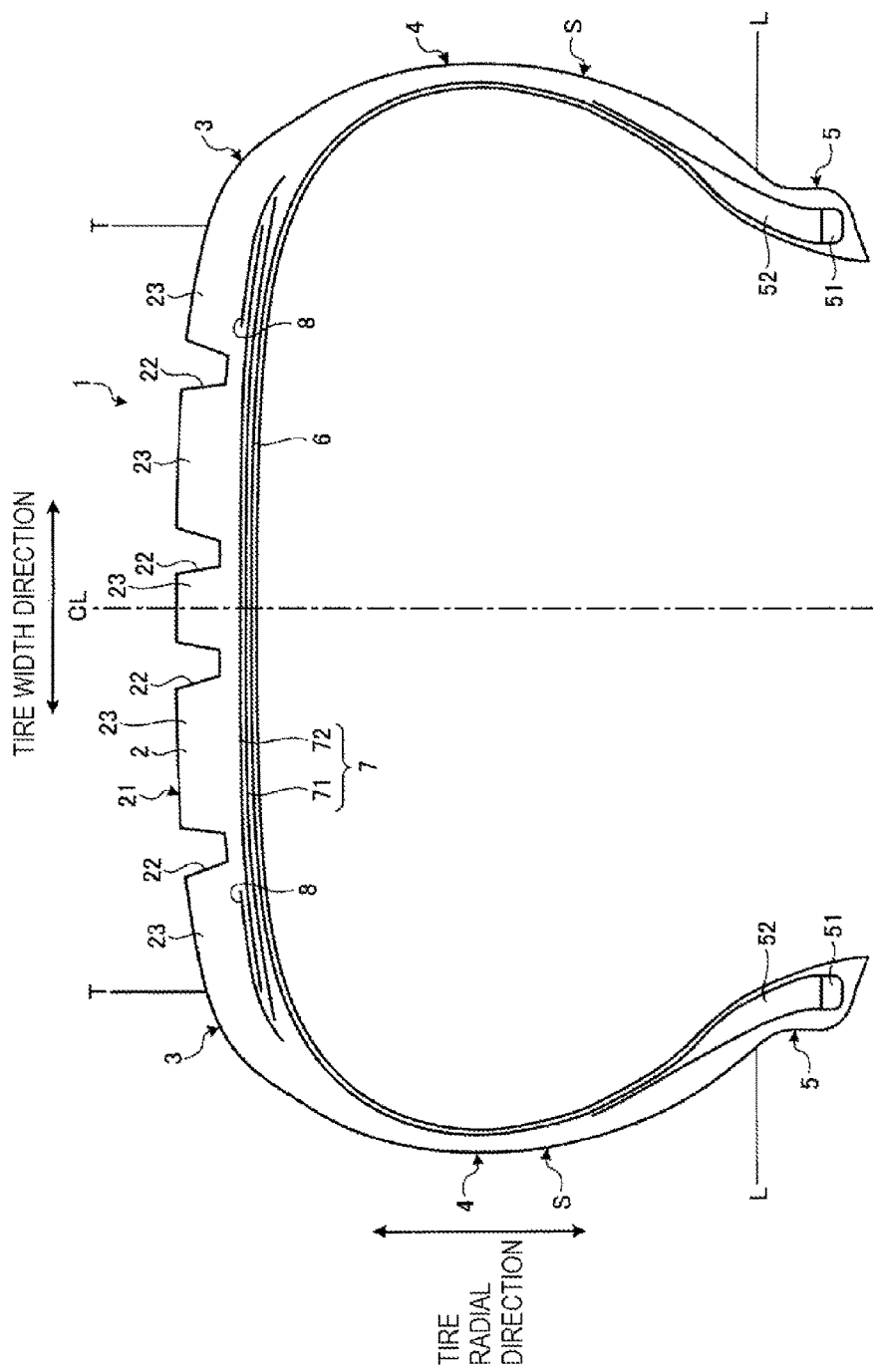
FIG. 1 is a meridian cross-sectional view of a pneumatic tire according to an embodiment of the present technology.

FIG. 1 is a meridian cross-sectional view of a pneumatic tire 1 according to the embodiment. In the following description, "tire radial direction" refers to a direction orthogonal to the rotational axis (not shown) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane.

As illustrated in FIG. 1, the pneumatic tire 1 of this embodiment includes a tread portion 2, shoulder portions 3 on both sides of the tread portion 2, and a side wall portion 4 and a bead portion 5 continuing sequentially from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread portion 2 or, rather, on a road contact surface that contacts a road surface when traveling. The tread surface 21 extends along the tire circumferential direction, and a plurality (four in this embodiment) of main grooves 22 that are straight main grooves parallel with the tire equator line CL are provided in the tread surface 21. Moreover, a plurality of rib-like land portions 23 extending along the tire circumferential direction and parallel with the tire equator line CL is formed in the tread surface 21 by the plurality of main grooves 22. Additionally, while not explicitly illustrated in the drawings, lug grooves that intersect with the main grooves 22 in each of the land portions 23 are provided in the tread surface 21. The land portions 23 are plurally divided in the tire circumferential direction by the lug grooves. Additionally, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are locations on both outer sides in the tire width direction of the tread portion 2. Additionally, the side wall portions 4 are exposed at an outermost side in the tire width direction of the pneumatic tire 1. The bead portions 5 include a bead core 51 and a bead filler 52. The bead core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) juxtaposed in the tire circumferential direction along the tire meridian direction having a given angle with respect to the tire circumferential direction, and covered by a coating rubber. The carcass cords are formed from organic fibers (e.g. polyester, rayon, nylon, or the like). At least one layer of this carcass layer 6 is provided.

The belt layer 7 has a multi-layer structure where at least two layers (belts 71 and 72) are stacked; is disposed on an outer side in the tire radial direction that is the periphery of the carcass layer 6, in the tread portion 2; and covers the carcass layer 6 in the tire circumferential direction. The belts 71 and 72 are constituted by a plurality of cords (not illustrated) juxtaposed at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), juxtaposed in the tire width direction and substantially parallel (±5 degrees) to the tire circumferential direction, which are covered by a coating rubber. The cords are formed from steel or organic fibers (e.g. polyester, rayon, nylon, or the like). The belt reinforcing layer 8 illustrated in FIG. 1 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formed so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

In cases where the pneumatic tire 1 of this embodiment is mounted on a vehicle (not illustrated), orientations with respect to the inner side and the outer side in the tire width direction of the vehicle are designated. The orientation designations, while not explicitly illustrated in the drawings, for example, can be shown via indicators provided on the side wall portions 4. Hereinafter, a side facing the inner side of the vehicle when mounted on the vehicle is referred to as a "vehicle inner side" and a side facing the outer side of the vehicle is referred to as a "vehicle outer side". Note that the designations of the vehicle inner side and the vehicle outer side are not limited to cases when mounted on the vehicle. For example, in cases when assembled on a rim, orientation of the rim with respect to the inner side and the outer side of the vehicle in the tire width direction is set. Therefore, in cases when the pneumatic tire 1 is assembled on a rim, the orientation with respect to the inner side (vehicle inner side) and the outer side (vehicle outer side) of the vehicle in the tire width direction is designated.

Figure 2:
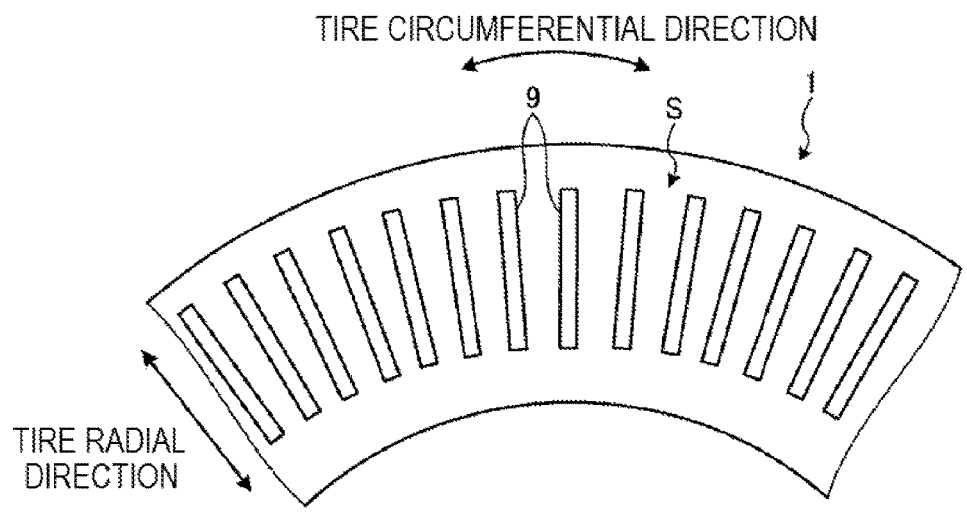
FIG. 2 is a partial external view of the pneumatic tire according to the embodiment of the present technology, viewed from the vehicle inner side.

FIG. 2 is a partial external view of the pneumatic tire according to this embodiment, viewed from the vehicle inner side. With the pneumatic tire 1 configured as described above, as illustrated in FIG. 2, a plurality of protrusions 9 protruding outward from the tire from a surface of the tire side portion S is provided on the tire side portion S on the vehicle inner side.

Here, the "tire side portion S" refers to, in FIG. 1, the outer side in the tire width direction from a ground contact edge T of the tread portion 2 or, in other words, a surface that uniformly continues in a range of the outer side in the tire radial direction from a rim check line L. Additionally, the "ground contact edge T" refers to both outermost edges in the tire width direction of a region in which the tread surface 21 of the tread portion 2 of the pneumatic tire 1 contacts the road surface when the pneumatic tire 1 is assembled on a regular rim and filled with regular inner pressure and 70% of a regular load is applied, and the ground contact edge T continues in the tire circumferential direction. Moreover, the "rim check line L" refers to a line used to confirm whether the tire has been assembled on the rim correctly and, typically, is an annular convex line closer to the outer side in the tire radial direction than a rim flange and continues in the tire circumferential direction along a portion adjacent to the rim flange on a front side surface of the bead portions 5.

Here, "Regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

The protrusions 9 are, for example, as illustrated in FIG. 2, formed as protrusions made from a rubber material (may be the rubber material forming the tire side portion S or a rubber material different from that rubber material) in an elongated form, and are disposed in the tire circumferential direction at predetermined intervals in a range of the tire side portion S.

The cross-sectional shape of the protrusions 9 in a lateral direction that intersects with the longitudinal direction is formed in a semi-circular shape, a semi-elliptical shape, a semi-oval shape, a triangular shape, a rectangular shape, a trapezoidal shape, or at least one portion of the outline of the cross-section has a circular arc. Furthermore, the cross-sectional shape in the longitudinal direction of the protrusions 9 may be formed so as to be uniform, or the cross-sectional shape in the longitudinal direction may be formed so as to vary. Additionally, an end portion of the protrusions 9 may protrude smoothly from the surface of the tire side portion S or may protrude abruptly from the surface of the tire side portion S. In FIG. 2, the protrusions 9 are formed as a single protrusion in the tire radial direction in the range of the tire side portion S, but may be plurally divided in the longitudinal direction. In cases where the protrusions 9 are divided, another protrusion 9 lined up in the tire circumferential direction thereof may be disposed so as to overlap, in the tire circumferential direction, a division of a protrusion 9 adjacent in the tire circumferential direction. Also, the protrusions 9 in FIG. 2 are formed in a straight line shape, but they may be bent or curved at an intermediate position, and there may be a plurality of bends and curves. Also, the protrusions 9 in FIG. 2 are formed in an elongated shape in the tire radial direction, but they may be formed inclined with respect to the tire radial direction.

Figure 3:
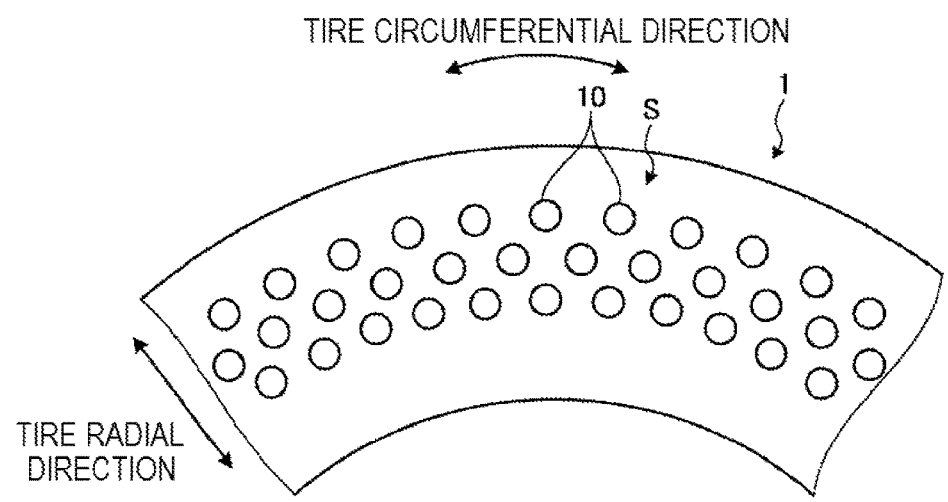
FIG. 3 is a partial external view of the pneumatic tire according to the embodiment of the present technology, viewed from the vehicle outer side.

FIG. 3 is a partial external view of the pneumatic tire according to this embodiment, viewed from the vehicle inner side. As illustrated in FIG. 3, with the pneumatic tire 1 configured as described above, a plurality of recesses 10 is provided depressed inward to the tire from the surface of the tire side portion S in the tire side portion S on the vehicle outer side.

The recesses 10 are, for example, as illustrated in FIG. 3, disposed in a range of the tire side portion S at predetermined intervals in the tire radial direction and the tire circumferential direction.

The opening shape of the recesses 10 opening at the surface of the tire side portion S may be circular, oval, elliptical, polygonal, or the like. Moreover, a cross-sectional shape of the recesses 10 may be semicircular, semi-elliptical, semi-oval, rounded cone shaped, rectangular, or the like. Note that while the recesses 10 in FIG. 3 are disposed in a staggered manner in the tire radial direction and the tire circumferential direction, they may be disposed in lines in the tire radial direction or disposed in lines in the tire circumferential direction.

In such a pneumatic tire 1, the height of the protrusions 9 is greater than 4 mm and not more than 10 mm. In addition, the bending rigidity EI in the lateral direction of the protrusions 9 is within the range not less than 0.1 MPa·mm$^4$ and not more than 10,000 MPa·mm$^4$. Here, E is the tensile elastic modulus (MPa), and I is the moment of inertia of area (mm$^4$).

In this way, the pneumatic tire 1 according to this embodiment has the plurality of protrusions 9 provided along the tire circumferential direction on the tire side portion S on the vehicle inner side, and the plurality of recesses 10 on the tire side portion S on the vehicle outer side.

Figure 4:
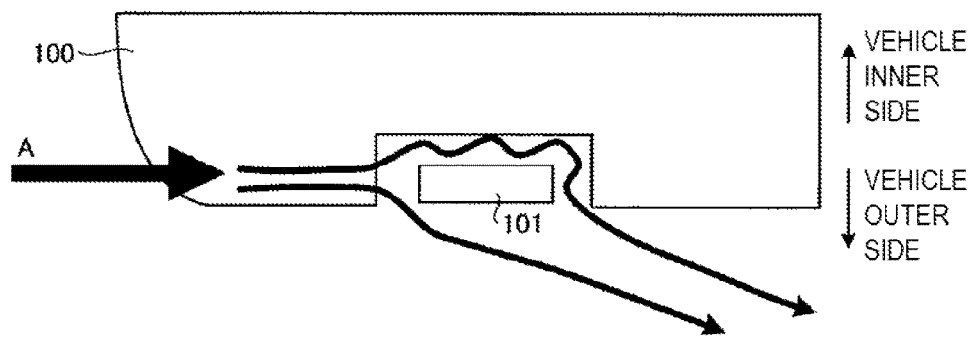
FIG. 4 is an explanatory drawing illustrating the flow of air around a normal pneumatic tire.

As illustrated in FIG. 4 which illustrates the flow of air around a normal pneumatic tire, a flow of air is produced in the direction of the arrow A in the drawings from the front to the rear of a vehicle 100 around a pneumatic tire 101 not having the protrusions 9 and the recesses 10 due to driving the vehicle 100. This air flow produces turbulence between the pneumatic tire 101 and the vehicle 100 on the vehicle inner side of the pneumatic tire 101 and passes. Also, on the vehicle outer side of the pneumatic tire 101, the air flow passes while spreading to the vehicle outer side. As a result, the air passing the side of the vehicle 100 spreads to the outer side, thereby increasing the air resistance with respect to the vehicle 100.

Figure 5:
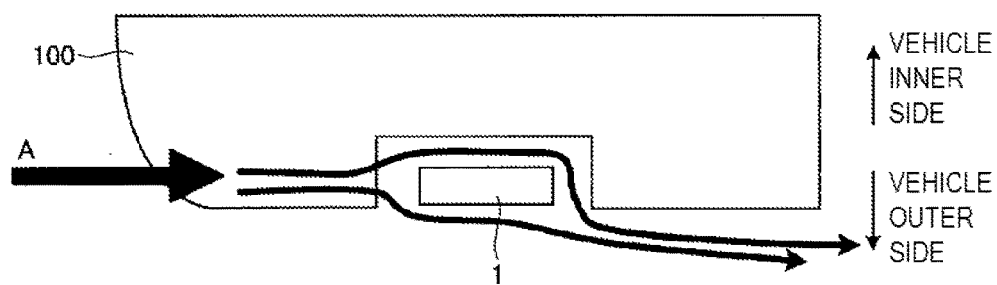
FIG. 5 is an explanatory drawing illustrating the flow of air around the pneumatic tire according to the embodiment of the present technology.

In contrast, as illustrated in FIG. 5 which illustrates the flow of air around the pneumatic tire according to this embodiment, with the pneumatic tire 1 in which the plurality of protrusions 9 is provided on the vehicle inner side and the plurality of recesses 10 is provided on the vehicle outer side, the air flow A from the front to the rear of the vehicle 100 is promoted and rectified by the protrusions 9 on the vehicle inner side of the pneumatic tire 1. Therefore, turbulence of the air flow passing the vehicle inner side of the pneumatic tire 1 is suppressed. On the other hand, the air flow A from the front to the rear of the vehicle 100 is made turbulent by the recesses 10 on the vehicle outer side of the pneumatic tire 1, a turbulent boundary layer is generated around the pneumatic tire 1, which suppress separation from the pneumatic tire 1. Therefore, spreading of the air flow passing the vehicle outer side of the pneumatic tire 1 is suppressed. As a result, the spread of the passing air is suppressed, so the air resistance of the vehicle 100 is reduced, and the fuel economy can be further improved.

Moreover, in this pneumatic tire 1, the height of the protrusions 9 is greater than 4 mm and not more than 10 mm.

Figure 6:
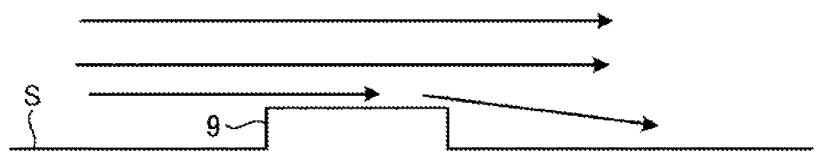
FIG. 6 is an explanatory drawing illustrating the flow of air around a protrusion having a height that is less than or equal to the prescribed range.
Figure 7:
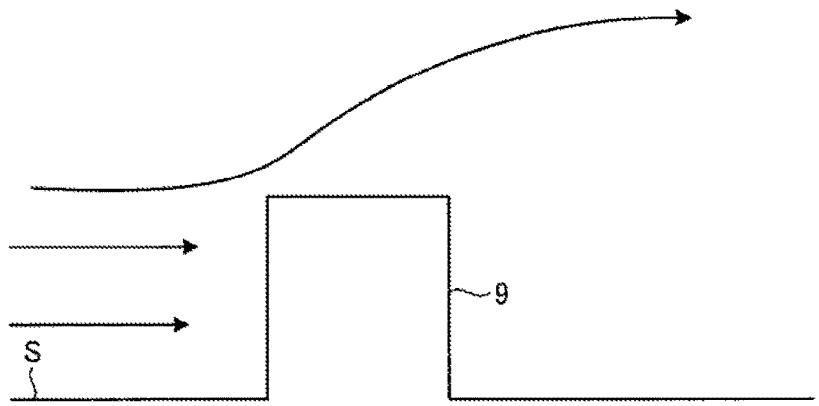
FIG. 7 is an explanatory drawing illustrating the flow of air around a protrusion having a height that is greater than or equal to the prescribed range.
Figure 8:
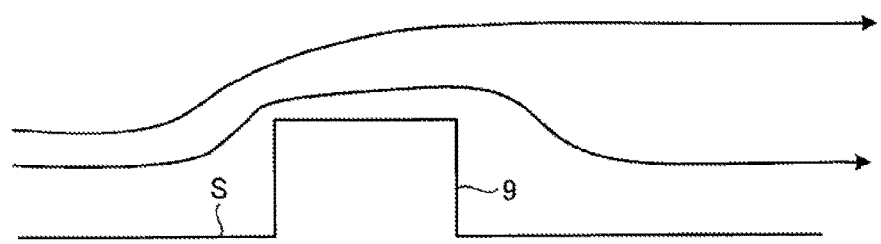
FIG. 8 is an explanatory drawing illustrating the flow of air around a protrusion having a height in the prescribed range.

If the height of the protrusions 9 is less than 4 mm, as in the explanatory drawing of FIG. 6 which illustrates the air flow around a protrusion having a height that is not more than the prescribed range, the range over which the protrusions 9 contact the air flow is small, so it is difficult to obtain a more significant flow promotion effect and rectification effect due to the protrusions 9. Also, if the height of the protrusions 9 exceeds 10 mm, as in the explanatory drawing of FIG. 7 that illustrates the flow of air around a protrusion having a height that is not less than the prescribed range, the range over which the protrusions 9 contact the flow of air will be large, so the protrusions 9 will increase the air resistance and the flow promotion effect and rectification effect will be small. On this point, with the pneumatic tire 1 of this embodiment, as in the explanatory drawing of FIG. 8 that illustrates the flow of air around a protrusion having a height that is within the prescribed range, the protrusions 9 appropriately contact the flow of air, and thereby it is possible to obtain a more significant flow promotion effect and rectification effect due to the protrusions 9, and the air resistance of the vehicle 100 can be effectively reduced.

In addition, with the pneumatic tire 1 according to this embodiment, the bending rigidity EI in the lateral direction of the protrusions 9 satisfies the range not less than 0.1 MPa·mm$^4$ and not more than 10,000 MPa·mm$^4$.

When the height of the protrusions 9 exceeds 4 mm, the air resistance of the protrusions 9 is large due to the centrifugal force associated with rotation of the tire and the force due to the air flow, so the protrusions 9 are easily deformed and it is difficult to obtain the above effects sufficiently. Moreover, when the protrusions 9 are deformed, the durability of the protrusions 9 deteriorates. Therefore, the bending rigidity EI in the lateral direction of the protrusions 9 is not less than 0.1 MPa·mm$^4$. However, if the deformation of the protrusions 9 is suppressed too much, the cross-section of the protrusions 9 will increase, the mass of the tire will increase, so the rolling resistance will tend to increase. Therefore, the bending rigidity EI in the lateral direction of the protrusions 9 is not more than 10,000 (MPa·mm$^4$).

In this way, according to the pneumatic tire of this embodiment, it is possible to effectively reduce the air resistance of the vehicle while suppressing the deterioration of the air resistance of the protrusions 9 and the increase in the rolling resistance of the tire.

Also, in the pneumatic tire of this embodiment, preferably, the number of protrusions 9 provided along the tire circumferential direction satisfies the range not less than 10 and not more than 50, and the width in the lateral direction satisfies the range not less than 0.5 mm and not more than 5 mm.

When the number of protrusions is less than 10, it is difficult to obtain the air flow promotion effect and the rectification effect. On the other hand, when the number of protrusions 9 exceeds 50, the protrusions 9 will increase the air resistance and the air flow promotion effect and the rectification effect becomes smaller, the tire mass increases and the rolling resistance tends to increase. Therefore, preferably, the number of protrusions 9 is in the range not less than 10 and not more than 50. Moreover, when the width of the protrusions is less than 0.5 mm, the protrusions 9 can easily deform and it becomes difficult to obtain the air flow promotion effect and the rectification effect. On the other hand, when the width of the protrusions 9 exceeds 5 mm, the protrusions 9 will increase the air resistance and the air flow promotion effect and the rectification effect becomes smaller, the tire mass increases and the rolling resistance tends to increase. Therefore, preferably, the width of the protrusions 9 is in the range not less than 0.5 mm and not more than 5 mm.

Figure 9:
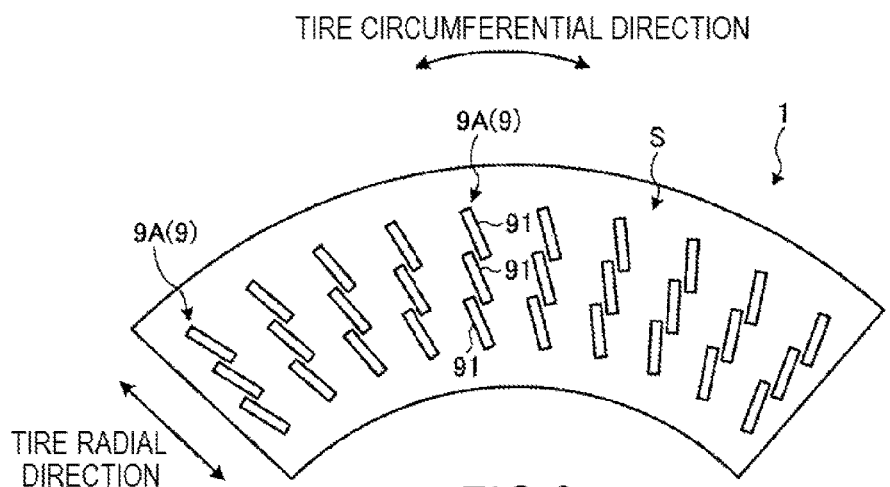
FIG. 9 is a partial external view of a pneumatic tire illustrating a preferred form of the protrusions.

Also, in the pneumatic tire 1 of this embodiment, as illustrated in FIG. 9 which illustrates a partial external view of the pneumatic tire having a preferred form of the protrusions, preferably, the protrusions 9 are formed as a row of fins 9A that is divided into a plurality of fins 91 in the longitudinal direction. In the row of fins 9A, the fins 91 overlap with each other in the tire circumferential direction and the tire radial direction, and extend overall in the tire radial direction.

In FIG. 9, the protrusions 9 are formed as rows of fins 9A divided into three fins 91 in the longitudinal direction, the projections of adjacent fins 91 overlap in the tire circumferential direction and the tire radial direction, extending overall in the tire radial direction. In FIG. 9, the fins 91 are disposed in sequence in one direction in the tire circumferential direction, but this is not a limitation. For example, although not illustrated on the drawings, the protrusions 9 may be formed as a row of fins 9A divided into three fins 91 in the longitudinal direction, and the fins 91 may be disposed in different directions from each other in the tire circumferential direction.

According to this pneumatic tire 1, the strain in the protrusions that occurs when the tire side portion S is bent in the tire circumferential direction and the tire radial direction is reduced by the overlap of the fins 91, so the durability of the protrusions 9 can be increased.

Figure 10:
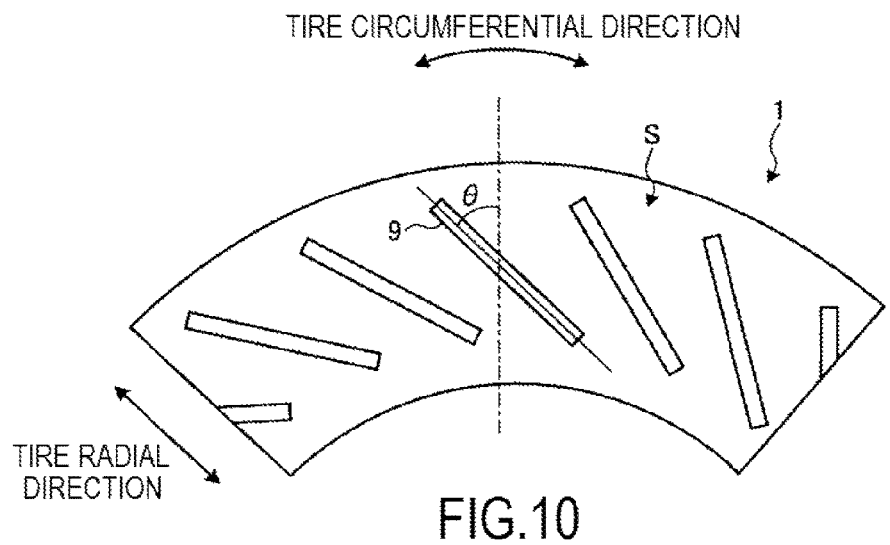
FIG. 10 is a partial external view of a pneumatic tire illustrating a preferred form of the protrusions.

Also, in the pneumatic tire 1 of this embodiment, as illustrated in FIG. 10 which illustrates a partial external view of the pneumatic tire having a preferred form of the protrusions, preferably, the inclination angle θ of the longitudinal direction of the protrusions 9 with respect to the tire radial direction satisfies the range ±60°.

Here, the longitudinal direction of the protrusions 9 is the straight line that connects both ends in the longitudinal direction of the protrusions 9, and the inclination of this straight line with respect to the tire radial direction satisfies the range +60° to −60°.

According to this pneumatic tire 1, the strain in the protrusions that occurs when the tire side portion S is bent in the tire circumferential direction or the tire radial direction is reduced by the inclination of the protrusions, so the durability of the protrusions 9 can be increased. As illustrated in FIG. 9, when the protrusions 9 are formed as rows of fins 9A divided into a plurality of fins 91 in the longitudinal direction, if the longitudinal direction of the protrusions 9 is the straight line that connects the end on the inner side in the tire radial direction of the fin 91 on the innermost side in the tire radial direction and the end on the outer side in the tire radial direction of the fin 91 on the outermost side in the tire radial direction, the inclination of this straight line with respect to the tire radial direction satisfies the range +60° to −60°.

Also, with the pneumatic tire 1 according to this embodiment, the outline of the cross-section of the protrusions 9 in the lateral direction is formed from straight lines or curved lines or a combination of straight lines and curved lines.

Figure 11:
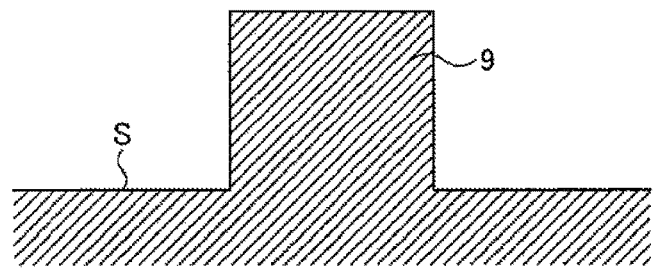
FIG. 11 is a cross-sectional view in the lateral direction of a protrusion.
Figure 12:
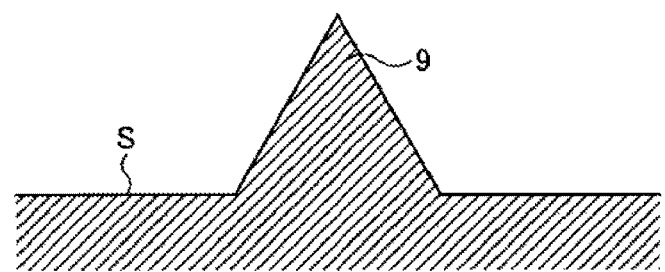
FIG. 12 is a cross-sectional view in the lateral direction of a protrusion.
Figure 13:
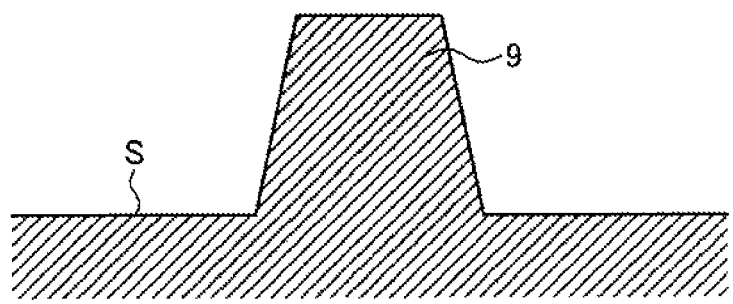
FIG. 13 is a cross-sectional view in the lateral direction of a protrusion.
Figure 14:
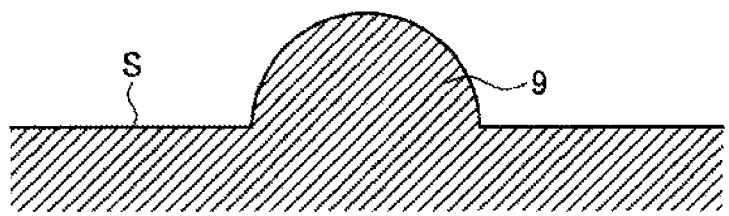
FIG. 14 is a cross-sectional view in the lateral direction of a protrusion.
Figure 15:
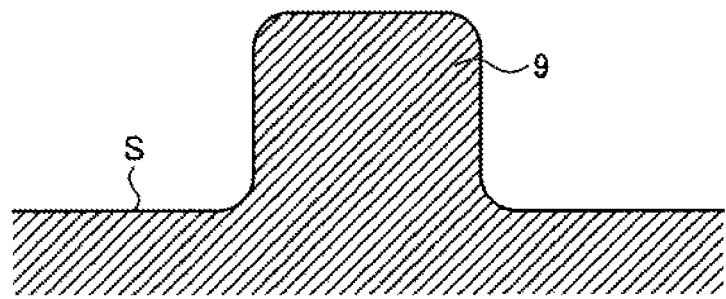
FIG. 15 is a cross-sectional view in the lateral direction of a protrusion.
Figure 16:
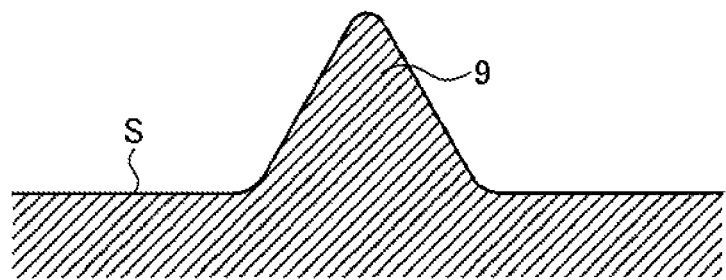
FIG. 16 is a cross-sectional view in the lateral direction of a protrusion.
Figure 17:
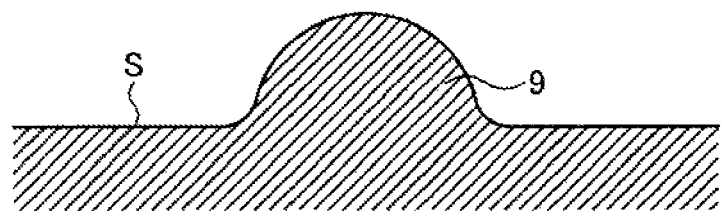
FIG. 17 is a cross-sectional view in the lateral direction of a protrusion.

Specifically, FIGS. 11 to 17 illustrate cross-sectional views of the protrusions in the lateral direction. In FIG. 11, the outline of the cross-section of the protrusion 9 in the lateral direction is formed from straight lines, and the cross-sectional shape of the protrusion 9 is a rectangular shape. Also, in FIG. 12, the outline of the cross-section of the protrusion 9 in the lateral direction is formed from straight lines, and the cross-sectional shape of the protrusion 9 is a triangular shape. Also, in FIG. 13, the outline of the cross-section of the protrusion 9 in the lateral direction is formed from straight lines, and the cross-sectional shape of the protrusion 9 is a trapezoidal shape. Also, in FIG. 14, the outline of the cross-section of the protrusion 9 in the lateral direction is formed from a curved line, and the cross-sectional shape of the protrusion 9 is a semi-circular shape. Also, in FIG. 15, the outline of the cross-section of the protrusion 9 in the lateral direction is a combination of straight lines and curved lines, and the cross-sectional shape of the protrusion 9 is a rectangular shape with curved lines on the corners, and the portion projecting from the tire side portion S is formed from curved lines. Also, in FIG. 16, the outline of the cross-section of the protrusion 9 in the lateral direction is a combination of straight lines and curved lines, and the cross-sectional shape of the protrusion 9 is a triangular shape with curved lines on the corner, and the portion projecting from the tire side portion S is formed from curved lines. Also, in FIG. 17, the outline of the cross-section of the protrusion 9 in the lateral direction is formed from a curved line, and the cross-sectional shape of the protrusion 9 is a semi-circular shape, and the portion projecting from the tire side portion S is formed from curved lines.

Also, in the pneumatic tire 1 of this embodiment, preferably, the diameter dimension of the openings of the recesses 10 satisfies the range not less than 0.5 mm and not more than 10 mm, and the depth satisfies the range not less than 0.3 mm and not more than 2 mm.

If the diameter dimension of the openings of the recesses 10 is not less than 0.5 mm and the depth is not less than 0.3 mm, sufficient turbulence generation effect can be obtained. On the other hand, if the diameter dimension of the openings of the recesses 10 is not more than 10 mm and the depth is not more than 2 mm, the turbulence generation effect can be obtained without increasing the air resistance.

EXAMPLES

In the examples, performance tests for rate of improvement in fuel economy, rate of improvement in air resistance, and rolling resistance were performed on a plurality of types of pneumatic tires under different conditions (see FIGS. 18A-18B).

In this performance testing, a pneumatic tire having a tire size of 195/65R15 was assembled on a regular rim and inflated to a regular inner pressure. Then, the pneumatic tire was mounted on a compact front-wheel drive vehicle having an engine displacement of 1,500 cc+motor assist drive.

Method of evaluating the fuel economy improvement rate: Fuel economy was measured for a case where the test vehicle described above was driven 50 laps on a 2 km (total length) test course at a speed of 100 km/h. Based on the measurement results, the fuel economy improvement rates were indexed with the index score of the pneumatic tire of the Conventional Example (100.0) being a reference. In this evaluation, larger index scores indicate enhanced fuel economy improvement rates.

In FIGS. 18A-18B, the pneumatic tire according to the Conventional Example had protrusions on the vehicle inner side and recesses on the vehicle outer side, but the height and bending rigidity of the protrusions were outside the prescribed ranges. The pneumatic tire according to the Conventional Example had protrusions with a rectangular shape in cross-section so that the outline in the lateral direction of the protrusions was formed from straight lines (see FIG. 11).

In FIGS. 18A-18B, the pneumatic tires according to Working Examples 1 to 15 had protrusions on the vehicle inner side and recesses on the vehicle outer side, and the height and bending rigidity of the protrusions were within the prescribed ranges. Also, in the pneumatic tires according to Working Examples 3 to 15 the number of protrusions in the tire circumferential direction and the width of the protrusions were within the prescribed ranges. Also, in the pneumatic tires according to Working Example 9 and Working Examples 13 to 15, the protrusions were rows of fins and the fins overlapped in the tire circumferential direction and the tire radial direction. Also, in the pneumatic tires according to Working Examples 10 to 15, the inclination of the protrusions with respect to the tire radial direction was within the prescribed range. Also, in the pneumatic tires according to Working Examples 12 to 15, the diameter dimension and depth of the recesses were within the prescribed ranges. The pneumatic tires according to Working Examples 1 to 11, Working Example 13, and Working Example 14 had protrusions with a rectangular shape in cross-section so that the outline in the lateral direction was formed from straight lines (see FIG. 11), the pneumatic tire according to Working Example 15 had protrusions with a triangular shape in cross-section (see FIG. 12), and the pneumatic tire according to Working Example 12 had protrusions with a semi-circular shape in cross-section so that the outline in the lateral direction was formed from a curved line (see FIG. 14).

As can be seen from the test results in FIGS. 18A-18B, the air flow around the tires and the fuel economy was improved for the pneumatic tires according to Working Examples 1 to 15.

What is claimed is:

1. A pneumatic tire having a vehicle inner/outer orientation when mounted on a vehicle, comprising: a plurality of protrusions provided on a vehicle inner side on an inner tire side portion in a tire circumferential direction, wherein the vehicle inner side is facing toward the vehicle when the tire is mounted on the vehicle; a plurality of recesses provided on a vehicle outer side on an outer tire side portion, wherein the vehicle outer side is facing away from the vehicle when the tire is mounted on the vehicle; and indicators on the inner tire side portion or the outer tire side portion, the indicators indicating the vehicle inner/outer orientation for the pneumatic tire when mounted on the vehicle;

a height of projection of the protrusions from the tire side portion being more than 4 mm and not more than 10 mm, the protrusions being formed elongated, a bending rigidity in a lateral direction satisfying a range not less than 0.1 MPa·mm$^4$ and not more than 10,000 MPa·mm$^4$, and an inclination of the protrusions in the longitudinal direction with respect to the tire radial direction satisfying a range ±60°.

2. The pneumatic tire according to claim 1, wherein a number of the protrusions provided along the tire circumferential direction satisfies a range not less than 10 and not more than 50, and a width of the protrusions in the lateral direction satisfies a range not less than 0.5 mm and not more than 5 mm.

3. The pneumatic tire according to claim 2, wherein the protrusions are formed as a row of fins divided into a plurality of fins in a longitudinal direction, and, in the row of fins, the plurality of fins overlap with each other in the tire circumferential direction and a tire radial direction, and extend overall in the tire radial direction.

4. The pneumatic tire according to claim 3, wherein a diameter dimension of the plurality of recesses satisfies a range not less than 0.5 mm and not more than 10 mm, and a depth satisfies a range not less than 0.3 mm and not more than 2 mm.

5. The pneumatic tire according to claim 2, wherein a diameter dimension of the plurality of recesses satisfies a range not less than 0.5 mm and not more than 10 mm, and a depth satisfies a range not less than 0.3 mm and not more than 2 mm.

6. The pneumatic tire according to claim 1, wherein the protrusions are formed as a row of fins divided into a plurality of fins in a longitudinal direction, and, in the row of fins, the plurality of fins overlap with each other in the tire circumferential direction and a tire radial direction, and extend overall in the tire radial direction.

7. The pneumatic tire according to claim 1, wherein a diameter dimension of the plurality of recesses satisfies a range not less than 0.5 mm and not more than 10 mm, and a depth satisfies a range not less than 0.3 mm and not more than 2 mm.

8. The pneumatic tire according to claim 1, wherein a diameter dimension of the plurality of recesses satisfies a range not less than 0.5 mm and not more than 10 mm.

9. The pneumatic tire according to claim 1, wherein a depth of the plurality of recesses satisfies a range not less than 0.3 mm and not more than 2 mm.

10. The pneumatic tire according to claim 1, wherein the protrusions are formed as a row of fins divided into a plurality of fins in a longitudinal direction.

11. The pneumatic tire according to claim 1, wherein the protrusions are formed as a row of fins and at least two fins in the row of fins overlap with each other in the tire circumferential direction and a tire radial direction.

12. The pneumatic tire according to claim 1, wherein a number of the protrusions provided along the tire circumferential direction satisfies a range not less than 10 and not more than 50.

13. The pneumatic tire according to claim 1, wherein a width of the protrusions in the lateral direction satisfies a range not less than 0.5 mm and not more than 5 mm.

14. The pneumatic tire according to claim 1, wherein the protrusions are not provided on the vehicle outer side on the outer tire side portion; and the recesses are not provided on the vehicle inner side on the inner tire side portion.

15. The pneumatic tire according to claim 1, wherein a width of the protrusions in the lateral direction satisfies a range not less than 0.5 mm and not more than 3 mm.

* * * * *